US 6,645,048 B1

(12) United States Patent
Linderholm et al.

(10) Patent No.: US 6,645,048 B1
(45) Date of Patent: Nov. 11, 2003

(54) EQUIPMENT FOR GRINDING/POLISHING A CURVED OR FLAT WALL ELEMENT

(75) Inventors: Dag G. Linderholm, Renninge (SE); Ingvar Eriksson, Stockholm (DE)

(73) Assignee: Novator AB, Stockholm (SE)

( * ) Notice: Subject to any disclaimer, the term of this patent is extended or adjusted under 35 U.S.C. 154(b) by 15 days.

(21) Appl. No.: 09/589,904

(22) Filed: Jun. 7, 2000

Related U.S. Application Data

(60) Provisional application No. 60/138,161, filed on Jun. 8, 1999.

(51) Int. Cl.$^7$ .................................................. B24B 7/19
(52) U.S. Cl. ........................... 451/28; 451/41; 451/124; 451/127; 451/150; 451/352; 451/358
(58) Field of Search ..................... 451/41, 28, 342–344, 451/352–354, 358–360, 451, 54, 124–127, 139, 150–179

(56) References Cited

U.S. PATENT DOCUMENTS

| 800,962 A | * | 10/1905 | Wattles | |
|---|---|---|---|---|
| 1,891,174 A | * | 12/1932 | Perazzoli | |
| 3,447,267 A | | 6/1969 | Kelber | ............................. 51/3 |
| 3,910,159 A | | 10/1975 | Gladwin | |
| 5,042,208 A | | 8/1991 | Richardson | ................... 51/180 |
| 5,964,645 A | * | 10/1999 | Jemt | ............................ 451/41 |

FOREIGN PATENT DOCUMENTS

| DE | 84 26 223 | 12/1984 | ............. B08B/1/04 |
|---|---|---|---|
| EP | 0 325 424 A2 | 7/1989 | ............. B64F/5/00 |
| JP | 61279216 | 12/1986 | ............. A47L/1/02 |
| JP | 9328897 | 12/1997 | ............. E04G/3/16 |
| WO | WO 97/10925 | 3/1997 | ......... B24B/13/015 |

* cited by examiner

Primary Examiner—Eileen P. Morgan
(74) Attorney, Agent, or Firm—Taylor & Aust, P.C.

(57) ABSTRACT

An apparatus for grinding and/or polishing a surface of a wall element includes a first elongate guide device oriented substantially parallel to the surface of the wall element. A second elongate guide device is movably coupled to the first elongate guide device and oriented orthogonally relative thereto. The second elongate guide device is oriented substantially parallel to the surface of the wall element and moves along the first elongate guide device. A polishing device is movably coupled to the second elongate guide device. The polishing device moves along the second guide device and polishes the surface of the wall element at a plurality of locations along the second guide device and along the first guide device.

23 Claims, 3 Drawing Sheets

EQUIPMENT FOR GRINDING/POLISHING A CURVED OR FLAT WALL ELEMENT

This application claims the benefit of U.S. Provisional Application No. 60/138,161, filed Jun. 8, 1999.

BACKGROUND OF THE INVENTION

1. Field of the Invention

The present invention relates in general to equipment for grinding/polishing a curved or flat wall element.

2. Description of the Related Art

It has previously been quite difficult, if at all possible, to very precisely and reliably grind or polish a structure having a curved surface, especially in the field. An example of such a curved structure is an aircraft cabin window, which needs to have micro cracks and other damage removed with a grinding/polishing procedure every two to four years. Aircraft cabin windows are especially difficult to grind/polish because the windows are made of stretched acrylics, which is a very heat sensitive material. Also, since the aircraft cabin windows are often curved along a single axis, special requirements are placed on the precision and geometry when grinding/polishing the surface thereof.

What is needed in the art is a device capable of precisely and reliably grinding or polishing a structure having a curved surface, especially while the structure is in the field.

SUMMARY OF THE INVENTION

The present invention provides a grinding tool attached to a frame which allows the grinding tool to follow the curvature of a surface to be polished by the grinding tool.

The invention comprises, in one form thereof, an apparatus for grinding and/or polishing a surface of a wall element. The apparatus includes a first elongate guide device oriented substantially parallel to the surface of the wall element. A second elongate guide device is movably coupled to the first elongate guide device and oriented orthogonally relative thereto. The second elongate guide device is oriented substantially parallel to the surface of the wall element and moves along the first elongate guide device. A polishing device is movably coupled to the second elongate guide device. The polishing device moves along the second guide device and polishes the surface of the wall element at a plurality of locations along the second guide device and along the first guide device.

The present invention suggests equipment which makes possible grinding or polishing of a curved wall element. A machine is provided having four degrees of freedom (x, y, z and one rotation). The machine has a grinding/polishing tool which can follow the surface of a cabin window having a single curvature. The tool maintains a well defined line contact throughout its movement over the curved surface. Water or any other coolant could be applied for additional cooling of the workplace.

The invention includes a frame with devices mounted thereon for fixing the frame to the wall element; first rectilinear, parallel guide devices fixed in the frame for guiding a respective support device of a carriage displaceably mounted in the frame in a first linear direction, the support devices having slide or roller elements intended to be in contact with a track mounted on and having the same curvature as the surface of the wall element and facilitating the movement of the carriage thereon in the first linear direction; second rectilinear, parallel guide devices connecting respective support devices to each other; a slide which is displaceably mounted on the second guide devices in a second linear direction substantially perpendicular to the first linear direction, the slide being disposed to carry a tool unit for grinding or polishing the wall element; a guide slide which is displaceably mounted on cooperating first guide devices and which is joined to a respective support device in such a manner that the support device is, firstly, pivotally mounted relative to the guide slide about a pivot axis parallel to the second guide devices, and, secondly, is displaceably mounted relative to the guide slide in a direction normal to the surface of the wall element carrying the track against which the slide or roller elements of the support devices are intended to be in contact; and devices arranged to bias each support device with its slide or roller element against the track. Such an arrangement makes it possible to anchor the frame in such a manner over the section of the wall element to be polished that the carriage and the tool unit carried thereon can be made to follow the curvature of the wall element with the operating axis of the tool unit always oriented parallel to the surface of the curved wall element.

The equipment is preferably so dimensioned and designed so as to be portable and suitable for use for polishing/grinding when the window is still mounted in the aircraft. The equipment can also be used for polishing of a window when the window is dismounted from the aircraft. The carriage and the slide with the tool unit mounted thereon can thus be manually operated or operated by servomotors which are computer controlled (not shown in the Figures). By virtue of the fact that the frame can be fixed to a wall element in any plane orientation, or arranged to follow a track with the wall curvature, the operator does not need to carry any portion of the weight of the equipment when it is being used.

The frame itself of the above-described equipment needs to have its fixing devices mounted on a surface having substantially the same curvature profile as the wall element to be ground or polished. This is not necessary, however, in the case when the roller elements are arranged to follow a curved track which follows the curvature of the wall element.

An advantage of the present invention is that an aircraft cabin window can be polished while the window is still mounted in the aircraft.

Another advantage is that a structure having a curved surface can be polished.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
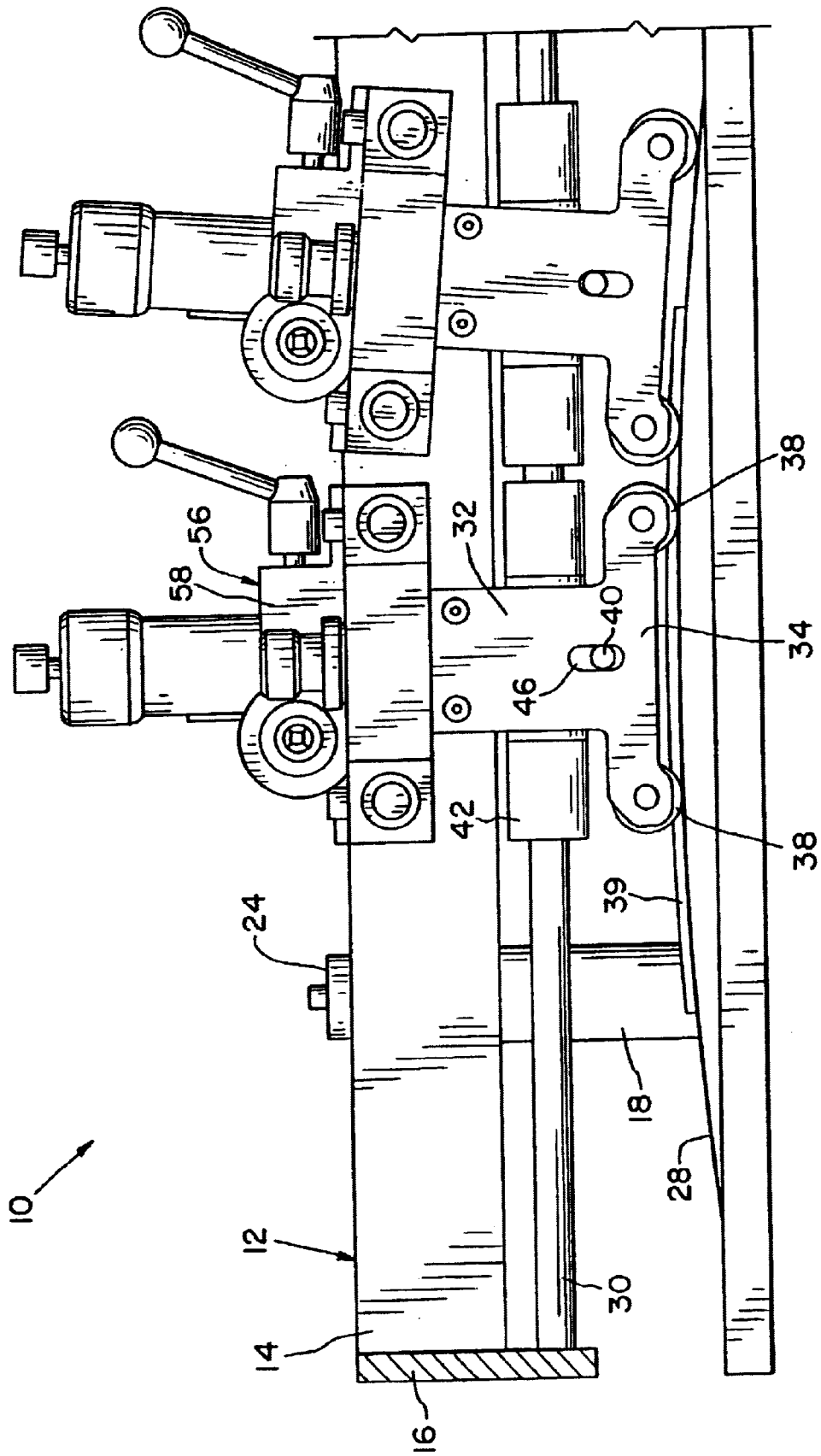
FIG. 1 is a side view of equipment according to one embodiment of the present invention, fixed on a curved surface.
Figure 2:
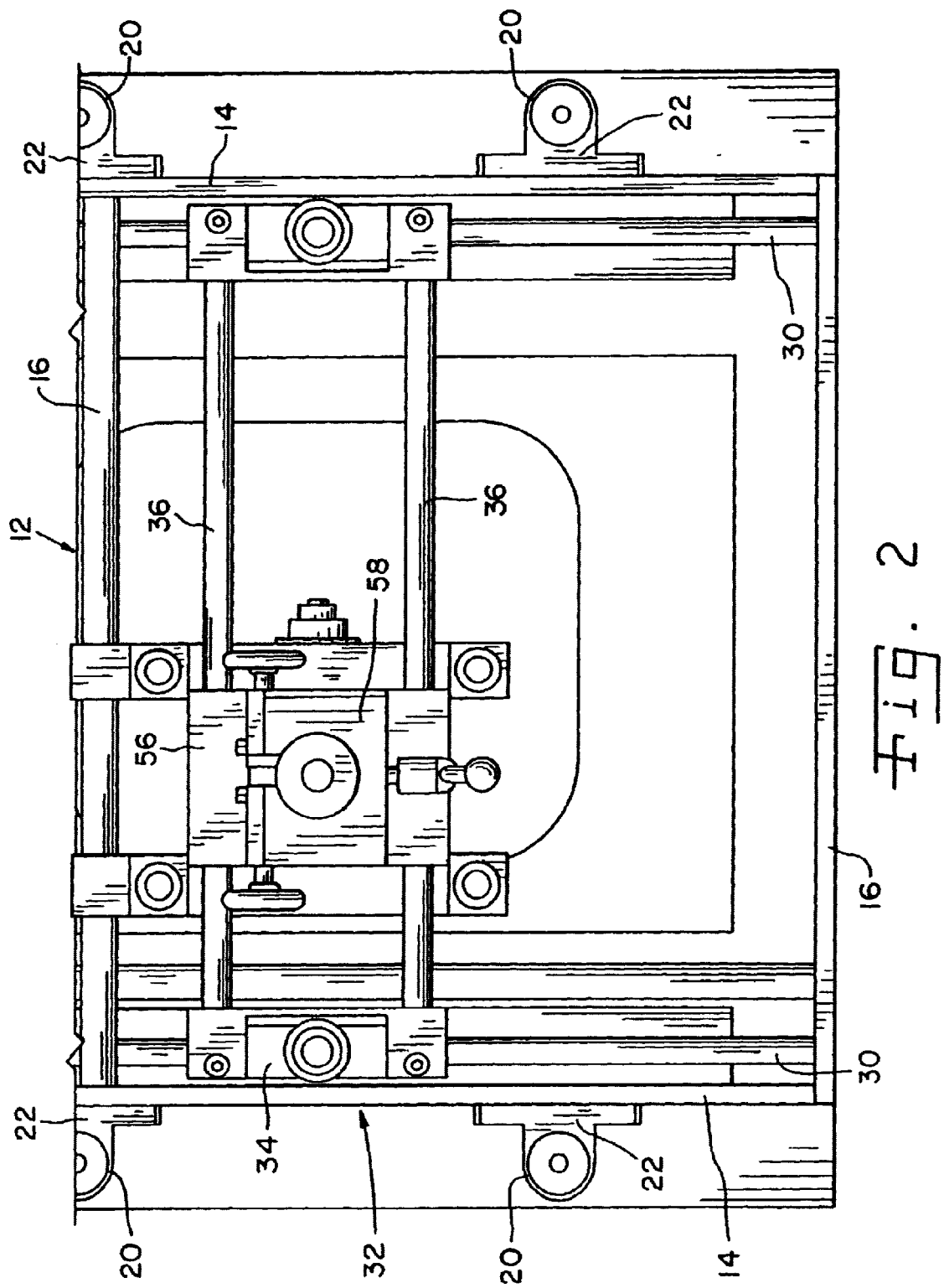
FIG. 2 is a plan view of the equipment in FIG. 1.

Referring now to the drawings and particularly to FIGS. 1 and 2, there is shown equipment 10 for grinding or polishing an underlying single-curved or flat piece of material. The equipment is primarily, but not exclusively, intended to be used for grinding/polishing of aircraft cabin windows.

Figure 4:
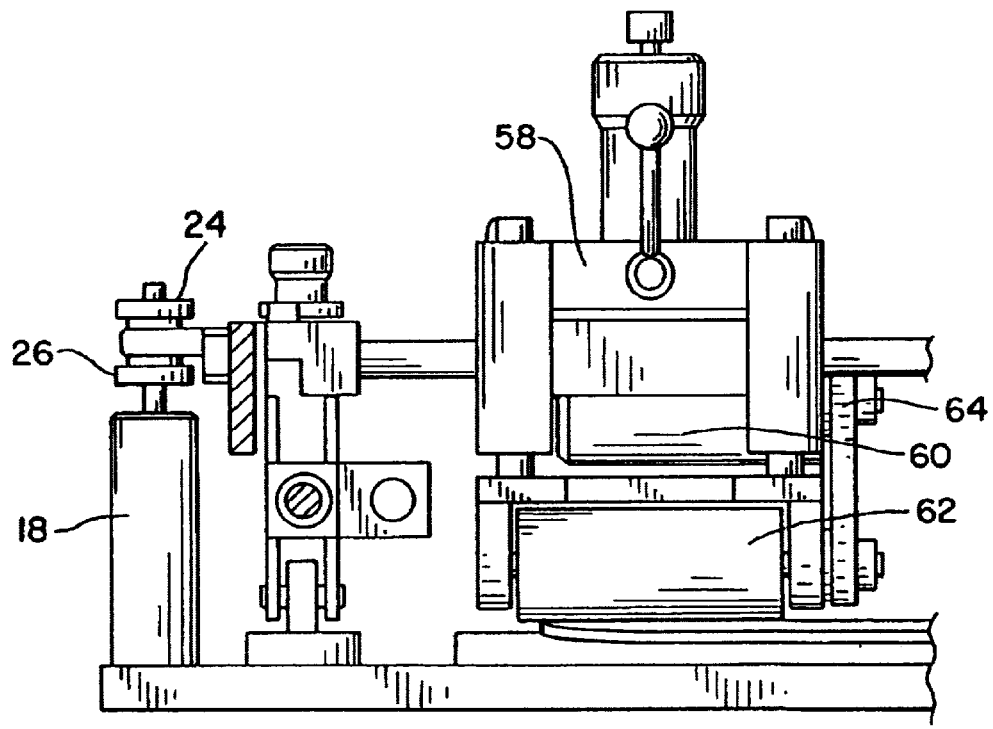
FIG. 4 is a fragmentary, front view of the equipment of FIG. 1.

The equipment 10 includes a frame 12 which has the shape of a rectangular frame 12 with opposite pairs of lateral frame beams 14 and 16. In each of the lateral frame beams 14 and 16 there are adjustably mounted a pair of frame-fixing devices 18 having suction cups 20 (FIG. 2). If equipment 10 is fixed on the aircraft, suction cups 20 are needed. However, if equipment 10 is used off the aircraft, suction cups 20 are not necessary. Each device 18 is supported in a respective holder 22, which is releasably fixable and movable laterally. The device 18 can be fixed in holder 22 by use of locking devices 24, 26 (FIG. 4) so that the longitudinal axis of the device 18 is kept oriented substantially normal to the curved (or planar) surface 28 on which the frame 12 is to be fixed. Frame 12 is positioned over the window to be ground or polished.

At the end portions of the lateral frame beams 16 there are fixed a pair of first parallel guide rods in the form of guides 30 for linear guiding of a carriage 32. The carriage 32 includes wheel sets 34 cooperating with individual guides 30. The wheel sets 34 are joined to each other by use of a pair of second parallel guides 36 oriented perpendicular to the first guides 30. At least one wheel set 34 is configured for rolling along curved (or planar) surface 28 as shown in FIG. 1.

Figure 3:
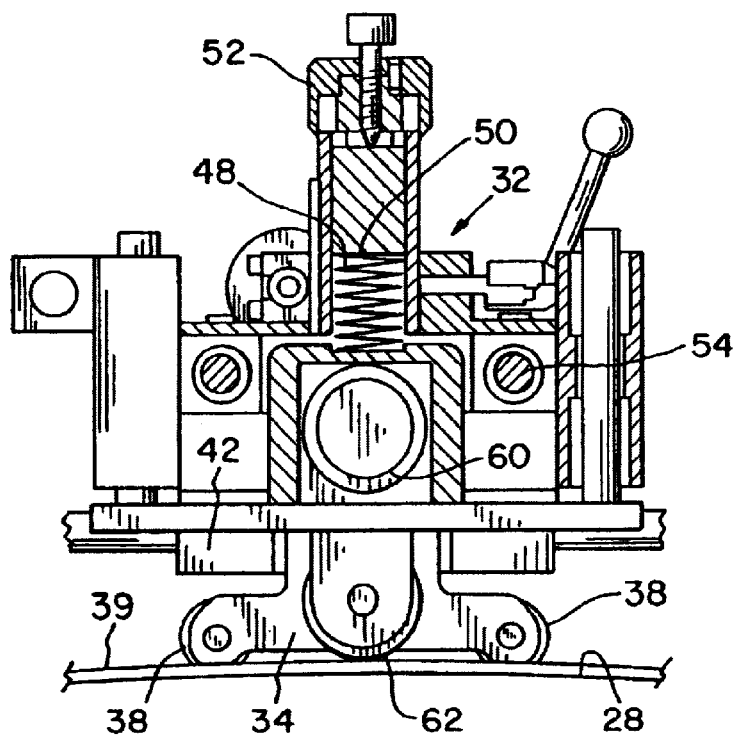
FIG. 3 is a sectional, side view of the holder of the equipment of FIG. 1.

Each wheel set 34 has a pair of rollers or wheels 38 spaced in the direction of movement of the carriage 32, in contact with a curved track 39. Track 39 is mounted on and conforms to the curvature of the surface 28 of the wall element which is to be ground or polished. As can be seen in FIG. 1, the wheel set 34 is pivotally mounted via a pin 40 in a guide slide 42. Guide slide 42 is displaceably guided on the guide 30 and can be locked thereto by use of a lock knob (not shown). The wheel set 34 is also limitedly displaceably mounted, relative to the guide slide 42, with the direction of displacement being perpendicular to the track 39 on which the wheels 38 roll. Enabling this displacement is a slot 46 (FIG. 1) in the wheel set 34. Slot 46 displaceably guides the pin 40 fixed in the slide 42. In order to keep the wheels 38 of the wheel sets 34 in contact with the track 39 regardless of whether the frame 12 is fixed above a surface, as shown in FIG. 1, or is fixed suspended on the underside of a surface to be ground or polished, the wheel set 34 is kept pressed against the track 39 by use of a tensile spring (not shown). Tensile spring 48 is fixed at 50 centrally between spindle 60 and an adjustable anchoring element 52. The guide slides 42 on the guides 30 are joined to each other by a transverse rod 54 (FIG. 3).

A slide 56 is displaceably mounted on the transverse second guides 36. A holder 58 is arranged on a slide 56 to horizontally fix a schematically-indicated tool unit or spindle 60 supporting a horizontally oriented tool 62. Tool 62 can be, e.g., a grinding/polishing cylinder. Spindle 60 drives grinding/polishing cylinder 62 through a belt coupling 64.

The wheel set 34 of the carriage 32 must be able to run on a profiled supporting surface, such as track 39. The fixing devices 18 do not necessarily need to be anchored on a profiled supporting surface. Rather, they can rest on an adjacent flat supporting surface. Alternatively, fixing devices 18 may not be used at all if the frame 12 is coupled to another frame set up on the supporting surface at the grinding/polishing location. The tool unit has in this case a grinding or polishing tool, e.g., a grinding cylinder.

The equipment 10 according to the invention is designed to be used in the following manner for grinding or polishing a curved or flat wall element, such as an aircraft window. For grinding/polishing in the field a window of an airplane, for example, the frame 12 is centered over the area to be ground/polished and is fixed in place by use of the fixing device 18 and the suction cups 20. The grinding cylinder 62 is then rotated by spindle 60 through belt coupling 64. After having achieved a steady-state rotational speed, grinding cylinder 62 is brought into contact with the surface of the window in order to grind/polish the window. The contact pressure between cylinder 62 and the window surface can be varied by compressing spring 48.

In order to reposition cylinder 62 to another area to be ground/polished, wheels 38 can be rolled along track 39 while carriage 32 is slid along guides 30. Additionally, cylinder 62 can be moved in the cross direction by slide 56 being slid along guides 36. By cooperatively moving cylinder 62 along both guides 30 and 36, grinding cylinder 62 can be positioned to grind/polish any area within the limits set by frame 12.

It is possible for grinding cylinder 62 to continue to rotate and maintain contact with the surface of the window while cylinder 62 is being moved along guides 30 and 36. Alternatively, it is also possible to stop the rotation of cylinder 62 and to pull it out of contact with the surface of the window before and while cylinder 62 is being moved along guides 30 and 36.

Within the scope of the invention, it is also possible to use the equipment for grinding or polishing all types of curved glass or plastic sheets or panes. For example, it is possible to grind or polish airplane windshields and cockpits.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for at least one of grinding and polishing a curved surface, said apparatus comprising:
   a first guide configured for being oriented substantially parallel to the surface;
   a carriage linearly guided by said first guide, said carriage including at least one wheel set configured for rolling along the curved surface in a direction parallel to said first guide;
   a second guide carried by said carriage and oriented orthogonally relative to said first guide, said second guide being configured for being oriented substantially parallel to the surface; and
   a polishing device movably coupled to said second guide, said polishing device being configured for moving along said second guide and polishing the surface at a plurality of locations along said second guide and along said first guide.

2. The apparatus of claim 1, wherein said first guide and said second guide conjunctively define a means for positioning said polishing device at a desired location on the surface.

3. The apparatus of claim 1, wherein said first guide comprises a pair of substantially parallel first guide rods, said second guide extending between and being oriented substantially perpendicular to said first guide rods.

4. The apparatus of claim 3, wherein said second guide comprises a pair of substantially parallel second guide rods, said apparatus further comprising a slide device slidably mounted on said second guide rods and carrying said polishing device.

5. The apparatus of claim 1, further comprising a frame supporting said first guide, said frame including at least one fixing device configured for attaching said frame to the surface.

6. The apparatus of claim 5, wherein said at least one fixing device comprises at least one suction cup.

7. The apparatus of claim 1, further comprising at least one curved track configured for being mounted on and conforming to the surface.

8. The apparatus of claim 7, wherein said at least one wheel set engages said at least one curved track.

9. The apparatus of claim 8, wherein said at least one wheel set includes at least one slot configured for enabling movement of said at least one wheel set in a direction substantially perpendicular to the surface.

10. An apparatus for at least one of grinding and polishing a surface, said apparatus comprising:
    a guide configured for being oriented substantially parallel to the surface, said guide including at least one wheel set configured for rolling along the surface; and
    a polishing cylinder movably coupled with said guide, said polishing cylinder being configured for moving along said guide and polishing the surface at a plurality of locations along said guide.

11. The apparatus of claim 10, wherein the surface is curved, said apparatus further comprising at least one curved track configured for being mounted on and conforming to the surface.

12. The apparatus of claim 11, wherein said polishing cylinder is configured for being rolled along said at least one track.

13. The apparatus of claim 12, further comprising a biasing element configured for biasing said polishing cylinder against the surface.

14. The apparatus of claim 10, wherein said polishing cylinder is configured to maintain a line contact with the surface.

15. The apparatus of claim 14, wherein a surface said polishing cylinder contacting the surface is substantially parallel to an axis of rotation of said polishing cylinder.

16. A method of at least one of grinding and polishing a surface, said method comprising the steps of:
    providing a first guide oriented substantially parallel to the surface;
    movably coupling a second guide to said first guide such that said second guide is oriented orthogonally relative to said first guide and substantially parallel to the surface, said second guide including at least one wheel set configured for rolling along the surface;
    movably coupling a polishing cylinder to said second guide; and
    moving said second guide along said first guide and moving said polishing cylinder along said second guide to thereby position said polishing cylinder at a desired location on the surface.

17. The method of claim 16, comprising the further step of using a biasing device to vary a contact pressure between said polishing cylinder and the surface.

18. The method of claim 16, wherein the surface is curved, said method comprising the further step of mounting at least one curved track to the surface such that said at least one track substantially conforms to the surface.

19. The method of claim 18, comprising the further steps of coupling a carriage to said first guide; and
    providing said carriage with at least one wheel set engaging said at least one track and carrying said second guide.

20. The method of claim 19, comprising the further steps of:
    slidably mounting a slide to said second guide, said slide carrying said polishing cylinder;
    sliding said slide along said second guide; and
    rolling said at least one wheel set along said at least one track while sliding said carriage along said first guide to thereby position said polishing cylinder at a desired location on the surface.

21. The method of claim 20, comprising the further step of using said polishing cylinder to continuously polish the surface during said sliding and rolling steps.

22. The method of claim 16, comprising the further steps of:
    providing a frame supporting said first guide, said frame including at least one fixing device; and
    using said fixing device to attach said frame to the surface.

23. The method of claim 21, comprising the further step of maintaining a line contact between said polishing cylinder and the surface during the polishing of the surface.

* * * * *